(12) United States Patent
Fermgård et al.

(10) Patent No.: US 7,180,509 B2
(45) Date of Patent: Feb. 20, 2007

(54) ELECTRONIC PEN, MOUNTING PART THEREFOR AND METHOD OF MAKING THE PEN

(75) Inventors: Björn Fermgård, Lund (SE); Ola Strömberg, Staffanstorp (SE)

(73) Assignee: Anoto AB, Lund (SE)

( * ) Notice: Subject to any disclaimer, the term of this patent is extended or adjusted under 35 U.S.C. 154(b) by 149 days.

(21) Appl. No.: 10/179,949

(22) Filed: Jun. 26, 2002

(65) Prior Publication Data

US 2004/0179000 A1  Sep. 16, 2004

Related U.S. Application Data

(60) Provisional application No. 60/301,447, filed on Jun. 29, 2001.

(30) Foreign Application Priority Data

Jun. 26, 2000 (SE) .................................. 0102287

(51) Int. Cl.
*G09G 5/00* (2006.01)

(52) U.S. Cl. .................. 345/179; 345/180; 14/411; 178/19.05

(58) Field of Classification Search ........ 345/173–183; 178/18.01–18.11, 19.01–19.07; 463/37–38; D19/55, 54, 84; D14/411, 432
See application file for complete search history.

(56) References Cited

U.S. PATENT DOCUMENTS

| | | | |
|---|---|---|---|
| 5,294,792 A | 3/1994 | Lewis et al. | |
| 5,600,348 A * | 2/1997 | Bartholow et al. | 345/180 |
| 5,652,412 A | 7/1997 | Lazzouni et al. | |
| 5,774,602 A | 6/1998 | Taguchi et al. | |
| 5,852,434 A | 12/1998 | Sekendur | |
| 6,104,388 A | 8/2000 | Nagai et al. | |
| 6,130,666 A | 10/2000 | Persidsky | |
| 6,188,392 B1 * | 2/2001 | O'Connor et al. | 345/179 |
| 6,474,888 B1 * | 11/2002 | Lapstun et al. | 401/45 |
| 6,550,997 B1 * | 4/2003 | King et al. | 401/45 |
| 6,627,870 B1 * | 9/2003 | Lapstun et al. | 250/221 |
| D483,806 S * | 12/2003 | Fermgård | D19/84 |
| D500,795 S * | 1/2005 | Andersson et al. | D19/55 |
| 2002/0190966 A1 * | 12/2002 | Fermgard | 345/179 |

FOREIGN PATENT DOCUMENTS

| | | |
|---|---|---|
| WO | WO 00/25293 | 5/2000 |
| WO | WO 00/73983 | 12/2000 |
| WO | WO 01/22208 | 3/2001 |
| WO | WO 01/26033 | 4/2001 |
| WO | WO 01/30589 | 5/2001 |

* cited by examiner

*Primary Examiner*—Lun-Yi Lao
(74) *Attorney, Agent, or Firm*—Birch, Stewart, Kolasch & Birch, LLP

(57) ABSTRACT

An electronic pen comprises a writing means (7) which extends into the interior of the pen, a guiding element (9) for the writing means (7), a sensor (15a) for recording images and an image processor (30) for calculating positions of the pen based on said images. The sensor (15a) is part of an imaging detector unit (15). The guiding element (9) and the detector unit (15) are arranged in a common mounting part (5) which is fixedly mounted in the interior of the pen. In such a pen, it is possible to minimize the tolerance chain between the components that convert a pen stroke on a base into a sequence of positions. This enables serial production of the pen with a small number of rejects.

36 Claims, 4 Drawing Sheets

ELECTRONIC PEN, MOUNTING PART THEREFOR AND METHOD OF MAKING THE PEN

This application claims priority on provisional Application No. 60/301,447 filed on Jun. 29, 2001, the entire contents of which are hereby incorporated by reference.

FIELD OF THE INVENTION

The present invention relates to an electronic pen comprising a writing means extending into the interior of the pen, a guiding element for the writing means, a sensor for recording images as well as an image processor for calculating positions of the pen based on said images. The invention also concerns a mounting part for an electronic pen as well as a method of making an electronic pen.

BACKGROUND ART

Pens of the type described by way of introduction can be used for, inter alia, electronic recording of handwritten information, as is known from e.g. U.S. Pat. No. 5,652,412, WO 00/25293, U.S. Pat. No. 5,294,792, U.S. Pat. No. 5,852,434 and WO 00/73983. Here a sensor records, preferably via one or more imaging components, images of an area around or beside the contact point of the writing means on a base. Each of the images may comprise, for example, part of a pattern applied to the base and/or part of the pen strokes made with the aid of the writing means on the base. An image processor, in the pen or in an external unit, receives the images from the sensor and creates, based on these, an electronic copy of the information handwritten on the base, in the form of a sequence of mutually related positions.

However, it may be difficult to manufacture the above prior-art pens in large volumes owing to the long tolerance chains that exist between the components included which convert a physical pen stroke on a writing base into a sequence of positions. If the tolerance of each individual component is not kept at a minimum, which is costly, the relative positioning of the components will thus vary quite significantly between different items of pens. As a result, many pens must be rejected in manufacture in that some items have insufficient precision in the recording of handwritten information.

The above prior-art pens are besides sensitive to mechanical shocks since there is a risk that the components inside the pen are displaced relative to each other if, for instance, the pen is dropped onto the floor.

Corresponding disadvantages appear in the electronic pen which is disclosed in WO 01/22208. The pen has an ink cartridge which extends into the interior of the pen for cooperation with a sensor which detects when the pen is contacted with a base. The ink cartridge is controlled by means of a threaded metal cone which is screwed to the casing at the front end of the pen, in the same way as in ordinary ball point pens. The pen also has an image sensor which is fixed to a printed circuit board in the pen, and an imaging system which is placed within the front end of the pen. Variations in the thread of the metal cone and in the screwing to the casing may result in the position of the ink cartridge in the pen varying between different items of pens. The position of the image sensor on the printed circuit board and the location of the printed circuit board in the interior of the pen may also vary between different items, as may also the location of the imaging system. Summing up, also this type of pen has long tolerance chains which may have a detrimental effect on the yield in serial production thereof.

Prior-art technique also includes U.S. Pat. No. 5,774,602 and WO 01/30589.

SUMMARY OF THE INVENTION

The object of the present invention is to at least partly overcome the above-described problems of prior-art technique.

More specifically, the invention aims at providing an electronic pen which is suitable for serial production, and a method of making such a pen.

A further object of the invention is to provide an electronic pen having shock resistance that is increased relative to prior art.

According to the invention, these and other objects that will appear from the following description are now wholly or partly achieved by means of an electronic pen and a mounting part as well as by a method according to the independent claims, preferred embodiments and variants being defined in the dependent claims.

The inventive electronic pen thus comprises a mounting part which holds the guiding element for the writing means and an imaging detector unit which contains the sensor for recording images. This means that the tolerance chain between the components that convert a pen stroke on the base into a sequence of positions can be minimized since the writing means and the detector unit can be located accurately relative to each other. Since the sensor is arranged as part of the detector unit, also the sensor can be located accurately relative to the mounting part and, thus, relative to the writing means. The detector unit can, but does not have to, be a separate physical unit. Alternatively the detector unit is an assembly of components, such as one or more lenses, one or more diaphragms, a sensor etc. which are each fixed to the mounting part.

Electronic pens according to the invention can thus be manufactured with minimal mutual variations in size and position of the depth of field of the detector unit in the longitudinal direction of the writing means, so that the focal plane of the detector unit can be located in an optimal relationship with the contact point of the writing means on a base. The pens may also be manufactured with minimal mutual variations in the distance between the imaged area on a base and the contact point of the writing means on the base, by the mounting part locating the optical axis of the detector unit relative to the longitudinal axis of the writing means.

The detector unit can be designed as a self-contained unit and may as such, in addition to the sensor, comprise an imaging system which is operatively connected with the sensor and defines the optical axis of the detector unit. Such a detector unit allows accurate relative positioning of the sensor and all the components included in the imaging system, for instance lenses and diaphragms. Moreover, such a self-contained unit can be both manufactured separately and tested before installation in the mounting part, which further minimizes the number of rejects in the manufacture of the electronic pen.

Similarly, the self-contained detector module which is formed when the mounting part is provided with guiding element and detector unit can be manufactured separately and tested separately from the other parts of the pen. According to the invention the functionality of each such detection module can be made independent of the process for assembling the pen, which simplifies and renders the manufacture of the pen more efficient and minimizes the number of rejected pens.

The use of a common mounting part also causes increased shock resistance of the pen owing to a reduced risk of the components in the pen being displaced relative to each other, for instance if the pen is dropped. The relative positioning of the guiding element and the detector unit is crucial to the function of the electronic pen since it determines the pen's capability of electronically detecting with repeatability its motion when writing information on a base.

According to an embodiment of the invention, the mounting part is arranged in a forward portion of the pen and constitutes part of a forward portion of the pen. This means that the mounting part may be given a double function since it may also be used to seal the forward portion of the pen in order to protect equipment inside the pen. Such an embodiment also allows a compact arrangement of the mounting part with guiding element and detector unit, while at the same time the guiding element may be caused to operate close to the contact point of the writing means on the base, and the detector unit/the sensor can be arranged close to the base. If the mutual distances between the components in the arrangement are minimized in this way, the effect of the mounting and/or production tolerances of the components will be further reduced.

In one embodiment, the guiding element for the writing means is formed as a portion of the mounting part. Reliable guiding can thus be achieved in a manner that is efficient in terms of manufacture.

The guiding element may comprise, for instance, a through hole which is designed to give the writing means a tight fit. This causes good guiding of the writing means while at the same time the writing means, when necessary, may be allowed to move essentially freely through the guiding element in its longitudinal direction.

In an additional embodiment, the pen further comprises a light source which is arranged in the mounting part and which gives improved detection of the motion of the pen when writing information on a base. According to prior-art technique, it is usually ensured that the area illuminated by the light source on the base is considerably larger than the imaged area on the same to meet position variations related to mounting and/or manufacturing between the light source, the writing means and the sensor, so that the illuminated area certainly overlaps the imaged area. The mounting in the common mounting part according to the invention results, however, in great accuracy in the positioning of the light source relative to the writing means as well as the detector unit. By the relevant tolerance chains being thus reduced, the size of the illuminated area on the base may also be reduced, which may be turned into a higher intensity of light within the illuminated area and/or a reduced power consumption.

The light source can be a light-emitting diode which is a simple and inexpensive illumination alternative.

In one embodiment, the sensor is an electrooptical image sensor, for instance of solid-state type.

The detector unit may be connected by means of a flexible electric coupling to the image processor arranged on a printed circuit board in the pen. This gives a safe electric contact that allows variations as regards the positioning of the printed circuit board in relation to the detector unit, and thus also to the mounting part and the writing means, thereby facilitating the assembly of the pen. Moreover the pen's susceptibility to shocks is minimized in that mechanical shocks that are absorbed by the mounting part, for instance via the writing means, are not transferred to the components of the printed circuit board which are potentially susceptible to shocks.

In one more embodiment, the pen also comprises a sensor which is adapted to sense whether the writing means is pressed against a base and which, directly or indirectly, is supported by the mounting part. The sensor enables activation of the detector unit and/or image processor and/or light source of the pen when the writing means is pressed against a base. The cooperation with the mounting part allows easy mounting with great accuracy in the relative positioning of the writing means and the sensor.

The sensor may be a pressure sensor. Such sensors are available on the market as standard components with small dimensions.

An insert adapted to hold a portion of a writing means may further be arranged in a movable and form-fit manner in a sensor housing accommodated in the mounting part and be arranged to be contacted with the sensor as the writing means is being pressed against a base. Such an insert allows a well-defined cooperation between the writing means and the sensor independently of the nature of the writing means. Exchange or repair of the writing means is also allowed by the insert being left in the sensor housing as the writing means is removed from the interior of the pen.

The mounting part of the pen may be made of plastic, which is an inexpensive and easily formable material. According to one embodiment, the mounting part is made by injection molding, for instance of a thermoplastic, which allows a rational manufacturing process.

The mounting part according to the invention has, in predetermined relative positions, a guiding element for a writing means and means for arranging an imaging detector unit for recording images. Such a mounting part gives great accuracy in the mounting of the writing means and the detector unit.

Additional features and advantages of the mounting part according to the invention are evident from the above description of the electronic pen.

The inventive method of making an electronic pen comprises the step of arranging a guiding element for a writing means and an imaging detector unit in a common mounting part, thereby allowing great accuracy and few rejects in manufacture.

According to a variant of the method according to the invention, the guiding element is formed as a portion of the mounting part, preferably as a through hole which is formed for a tight fit with the writing means. This is a rational way of forming the guiding element since it minimizes the number of components included.

In a variant, a light source is arranged in the mounting part. In this way, a light source for improved detection may be mounted in an efficient and accurate way.

According to a preferred variant of the method according to the invention, the mounting part is arranged in a forward portion of the pen, which allows the arranged components to be safely mounted in the forward portion of the pen.

Additional features and advantages of the method according to the invention are evident from the above description of the electronic pen.

BRIEF DESCRIPTION OF THE DRAWINGS

The invention will now be described in more detail by way of an embodiment and with reference to the accompanying drawings, in which.

DESCRIPTION OF PREFERRED EMBODIMENTS

Figure 1:
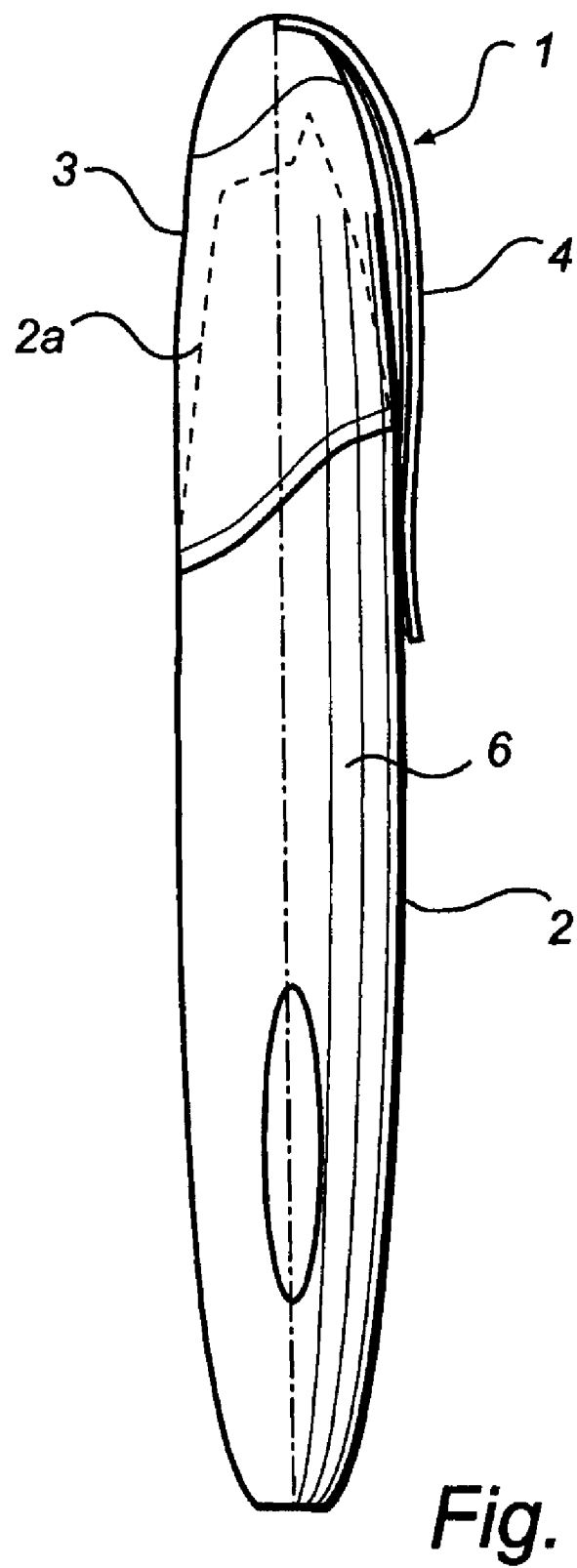
FIG. 1 is a side view and shows an electronic pen according to the invention.
Figure 2:
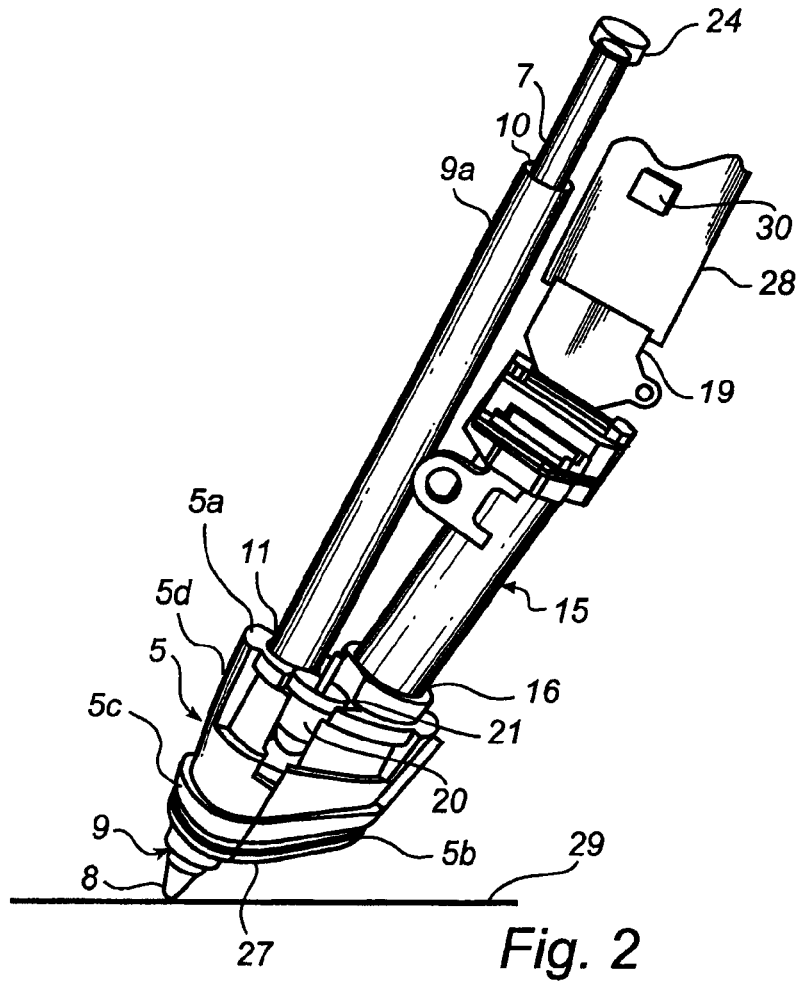
FIG. 2 is a perspective view and shows a mounting part according to the invention with components arranged therein.
Figure 3:
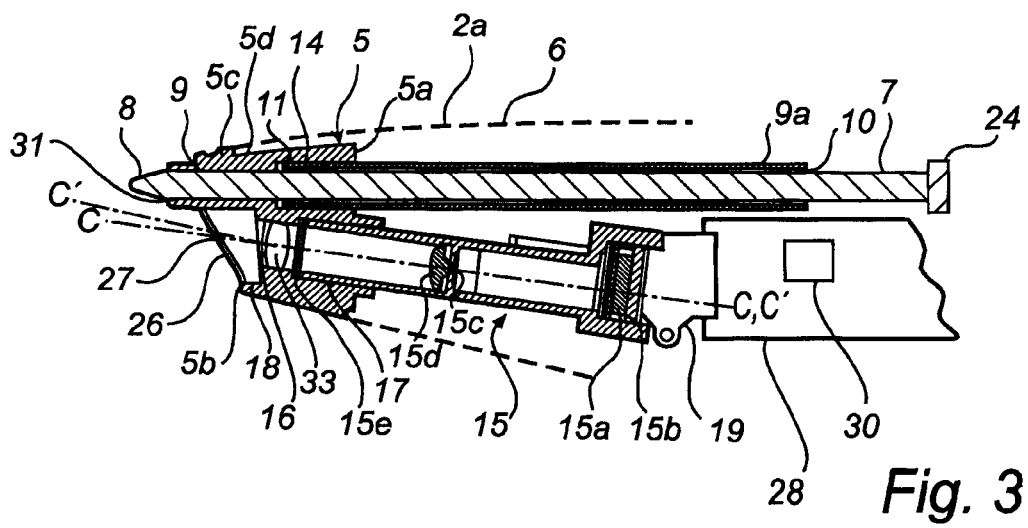
FIG. 3 is a sectional view and shows the mounting part and some of the components arranged therein.

The electronic pen 1 in FIG. 1 has a body 2 with a forward portion 2a and a cap 3 with a clip 4. In the forward portion 2a of the pen 1, a mounting part 5 is arranged partly inside a casing 6, as illustrated in FIGS. 2 and 3. The mounting part 5 constitutes part of the interior of the pen 1 and has an inner end 5a facing inwards in the casing 6 and an outer end 5b facing out of the casing 6, as shown in FIG. 2. An ink cartridge 7 with a pen point 8 is inserted into a tubular mounting aid 9a and, in the portion adjacent to the pen point 8, inserted into a guiding element in the form of a pen point guide means 9, which in a portion adjacent to the outer end 5b of the mounting part 5 is essentially cylindrical and in a portion adjacent to the inner end 5a of the mounting part 5 widens slightly conically. Between the ink cartridge 7 and the inside of the mounting aid 9a there is a certain play 10. A play (not shown) can correspondingly be found between the ink cartridge 7 and the inside of the pen point guide means 9. The mounting aid 9a is inserted and fixed in a first mounting hole 11 in the form of a first recess in the inner end 5a of the mounting part 5. The first mounting hole 11 and the pen point guide means 9 form a through bore or hole 14. A camera unit 15 is inserted and fixed in a second mounting hole 16, which adjacent to the inner end 5a of the mounting part 5 has a second recess 17 and adjacent to the outer end 5b of the mounting part 5 a third recess 18. The camera unit 15 is connected to a printed circuit board 28 by means of a flexible electric coupling 19.

The camera unit 15 is a self-contained unit arranged around a tubular housing or casing formed in one piece, whose one end is formed with a sensor space for holding an electrooptical image sensor 15a, such as a CCD or CMOS sensor. Optionally, one or more optical filters may be arranged in the sensor space in front of the sensor 15a, which is fixed in the sensor space by means of a lockable plate 15b. The tubular housing defines internally an aperture 15c. An imaging lens 15d is attached in front of the aperture 15c. At the other end of the housing, an optical filter 15e is mounted, which also serves to seal the housing. The imaging components of the camera unit 15, in this example the aperture 15c and the lens 15d, together define an optical axis C, which in the mounted state of the camera unit extends through the mounting part 5.

The camera unit 5 may be assembled in a simple manner by the lens 15d being inserted into the housing to abut against the aperture 15d and being fixed thereto, for instance by ultrasonic welding. The sensor 15a is mounted in the sensor space, and the filter 15e is mounted to seal the housing. Alternatively, the filter 15e can be loosely arranged in front of the open end of the housing in connection with the installation of the camera unit 15 in the mounting part 5.

Figure 5:
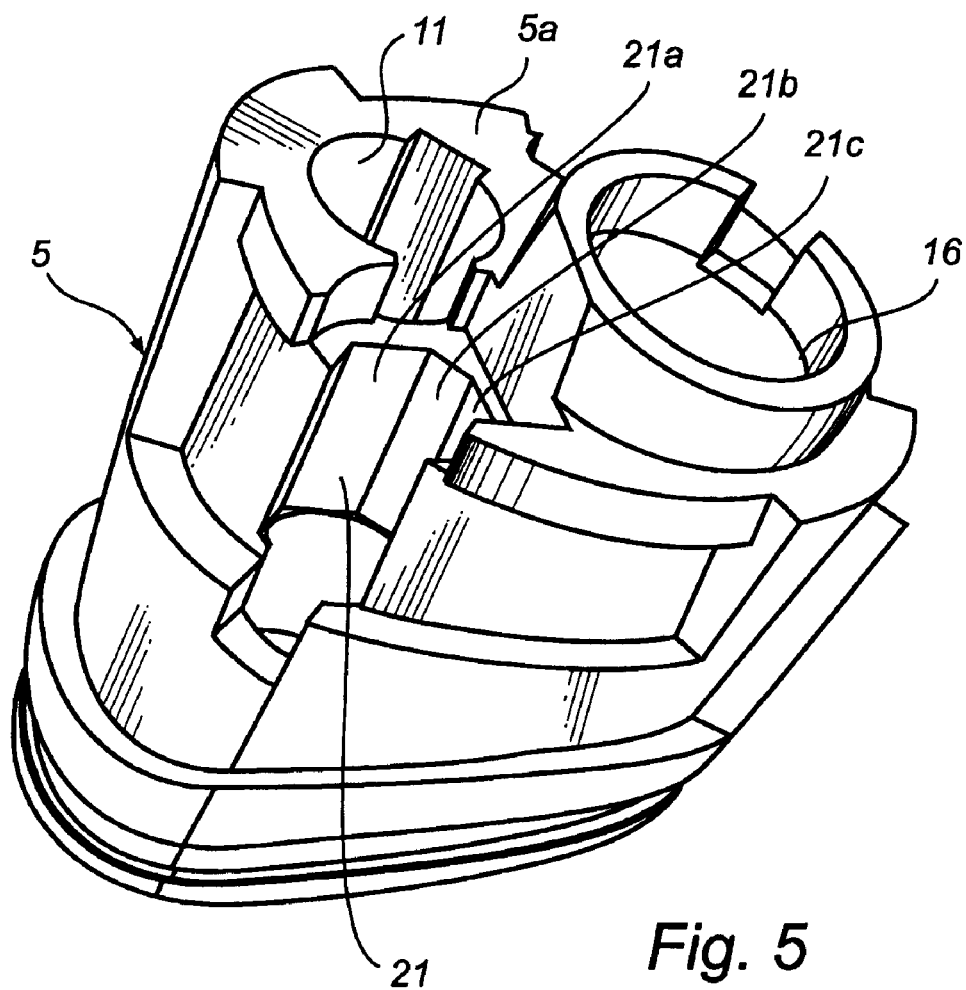
FIG. 5 is a perspective view and shows in detail a mounting part according to the invention.

In the mounting part 5, a light-emitting diode 20 is inserted and fixed in a third mounting hole 21, which has three walls 21a, 21b, 21c which are inclined relative to each other (FIG. 5). In the second mounting hole 16 there may also be optics 33, such as a prism or mirror arrangement, for angling the optical axis C of the camera unit 15, suitably towards the pen point 8, to form an overall optical axis C'. Optics, such as a prism or mirror arrangement (not shown), for guiding and/or forming the light cone emitted by the light-emitting diode 20 can correspondingly be arranged in the third mounting hole 21. The interior of the pen also contains other electronic components, such as a processor 30 (schematically illustrated in FIG. 3).

When the electronic pen 1 is not used, the cap 3 is normally arranged on the forward portion 2a of the pen 1 and then protects the pen point 8 and other components in the forward portion 2a of the pen 1. The clip 4 can then be used to fix the pen 1, for instance, in a shirt pocket. When the pen 1 is to be used, the cap 3 is removed and the pen 1 is set in a standby position, which may cause an image processor in the form of the processor 30 to be activated. When the pen point 8 of the pen 1 is pressed against a base 29, the ink cartridge 7 is allowed to move somewhat in its longitudinal direction owing to the play 10 between the ink cartridge 7 and the inside of the pen point guide means 9 and the mounting aid 9a respectively. The ink cartridge 7 exerts a pressure upon a pressure sensor 24 in the pen 1. Signals from the pressure sensor 24 are used to fully activate equipment, such as the processor 30 and/or the camera unit 15 and/or the light-emitting diode 20, in the electronic pen 1.

Figure 4:
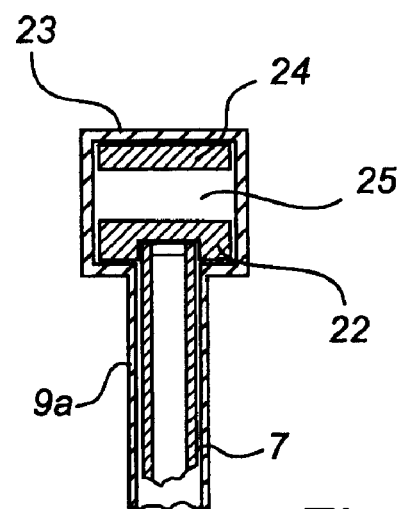
FIG. 4 is a sectional view and shows a portion of the mounting part according to a variant of the invention.

In an embodiment as shown in FIG. 4, a rear end portion of the ink cartridge 7 is inserted and press fitted into an insert 22, which is movably arranged in a pressure sensor housing 23 which is formed in, or attached to, the inner end of the mounting aid 9a. The pressure sensor 24 is attached to a wall in the space defined by the pressure sensor housing 23. The space 25 is defined so that the insert 22 can move towards and away from the pressure sensor 24, but simultaneously so that the insert 22 cannot move out of the pressure sensor housing 23. The insert 22 is designed in such manner that it can hold various makes of similar ink cartridges, which makes it possible to use exchangeable ink cartridges for ordinary ball point pens. The insert 22 ensures good contact with the pressure sensor 24 when the pen point 8 of the ink cartridge 7 is pressed against the base 29 and reduces the risk of ink possibly leaking out damaging the pressure sensor 24. The design of the space 25 causes the insert 22 to stay in the right place when an ink cartridge 27 is removed from the pen 1 to be exchanged. The play 10 between the ink cartridge 7 and the inside of the mounting aid 9a ensures that the ink cartridge 7 can be removed from the pen 1 with minor resistance only. When mounting a new ink cartridge 7, the mounting aid 9a ensures that the ink cartridge 7 is correctly positioned in the interior of the pen.

It should be emphasized that the pressure sensor housing 23, instead of being supported by the mounting part 5, can be attached to the casing 6 of the pen or to the printed circuit board 28. The embodiment in FIG. 4 minimizes, however, the risk of misalignment of the pen point guide means 9 and the pressure sensor housing 23. Such misalignment may interfere with the axial motion of the ink cartridge 7, so that an arbitrary delay is introduced in the pressure sensor's detection of the pen's contact with the base. Furthermore such misalignment may cause increased wear on the insert and/or the pressure sensor. The embodiment involving a pressure sensor housing 23 supported by the mounting part 5 may also reduce the pen's susceptibility to mechanical shocks.

It should also be appreciated that other types of sensors may be used to activate the pen 1 when the pen point 1 is pressed against a base 29. For instance, part of an open electric circuit may be arranged (not shown) in the position of the pressure sensor 24. In this case, the insert 22 is provided with metal pins or sheets which, as the pen point 8 is being pressed against the base 29, come into contact with and close the electric circuit in the space 25. Alternatively, an optical or magnetic detector can be used to sense the motion of the ink cartridge 7.

When a user writes with the activated pen 1, in the same way as with an ordinary pen, the area adjacent to the pen point 8 is illuminated by the light-emitting diode 20. The camera unit 15 records images of the writing base 29 adjacent to the pen point 8 of the pen, and the processor 30 calculates the position of the pen 1 based on these images. Here, a specific pattern (not shown) on the writing base 29 may be used, for instance of the type as described in Applicant's PCT Publications WO 00/73983 and WO 01/26033, which are herewith incorporated by reference. With the aid of the pattern on the writing base 29, the position of the pen 1 can at any moment be determined thereby, and in this way that written by the user can be recorded. The camera unit 15 is preferably a solid-state image sensor, but also other types of two-dimensional detectors can be used, for instance those which can read chemical, acoustic, electromagnetic, capacitive or inductive marks.

Figure 6:
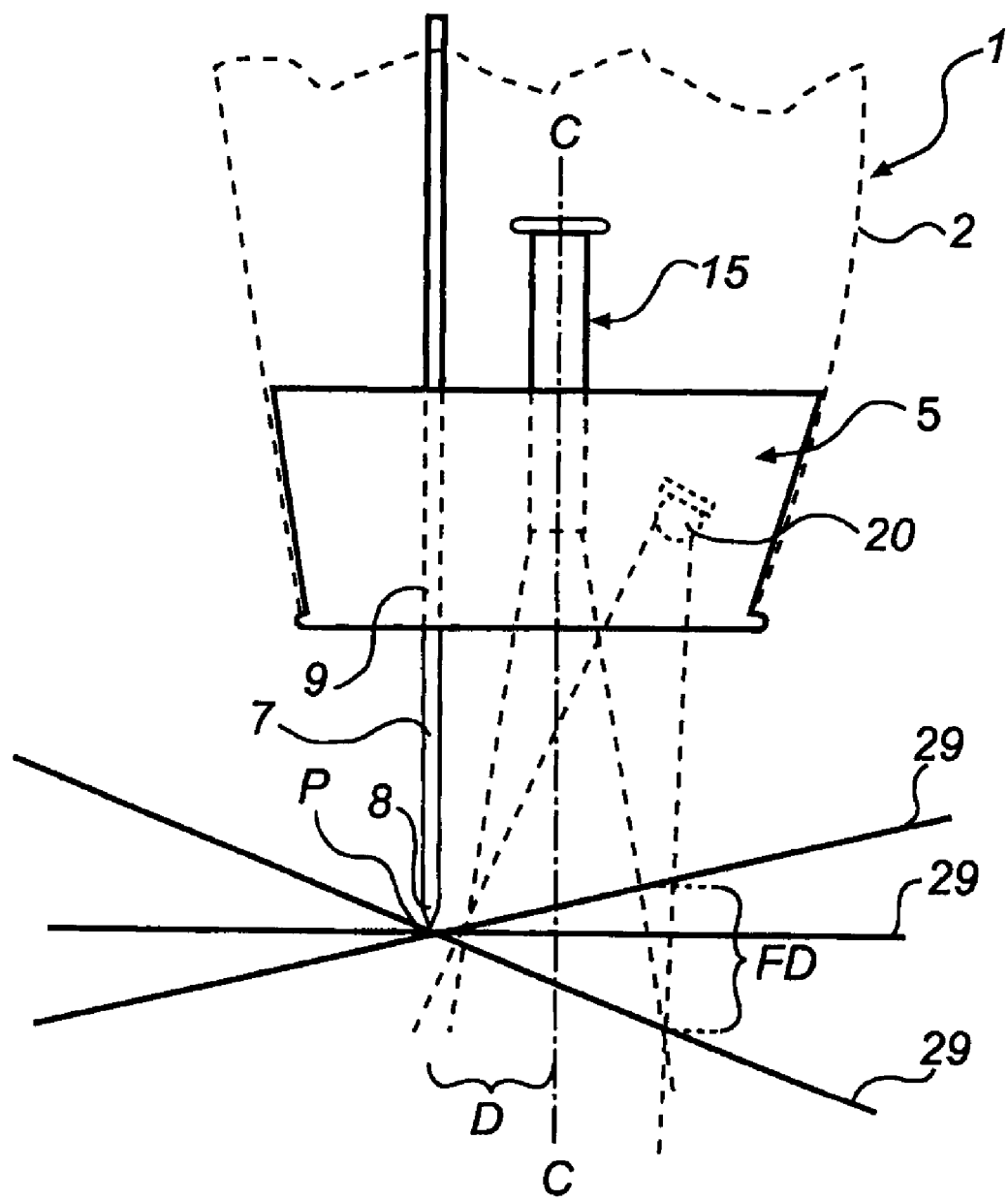
FIG. 6 is a schematic side view and illustrates relations between contact point, imaged area and illuminated area for an electronic pen.

In order to determine the position of the pen 1, the relative positioning of the pen point 8 and the camera unit 15 is important. In order to further illustrate this, FIG. 6 shows relevant components of the pen 1 with different inclinations relative to the base 29.

An important parameter of the pen 1 is the depth of field FD of the camera unit 15 which is required to ensure that the recorded images, for all conceivable inclinations of the pen, have adequate sharpness over relevant parts of the imaged area. As will appear from FIG. 6, this necessary depth of field is proportional to the distance D in any nominal plane between the contact point P, i.e. the pen point 8, and the optical axis C of the camera unit 15. With insufficient control of the tolerance chains, the distance D may thus for some pens be so great that the camera unit 15 is not capable of supplying useful images to the processor. This may be solved by constructing the camera unit 15 with a great nominal depth of field, which however causes an undesirable restriction of the amount of light that can be transferred to the sensor by the imaging components.

When decoding a position-coding pattern on the base, the distance D is also important to relate the position of the electronic pen stroke to the physical pen stroke on the base. For instance, the processor 30 can be arranged to calculate, based on one image, the spatial orientation (inclination and rotation) of the pen and a position, and, knowing the position, the spatial orientation and the distance D, to calculate a writing position, i.e. the position of the contact point P. Deviations from the nominal value of the distance D thus introduce systematic errors in the calculated writing positions.

It is also most important to minimize variations in the axial distance between the contact point P and the camera unit 15. Such variations affect the position of the focal plane of the camera unit 15 relative to the base and must therefore be met with a great nominal depth of field of the camera unit 15.

In contrast to prior-art pens, where the pen point guide means, the sensor and the imaging components have been attached to different parts of the interior of the pen, the guiding element or the pen point guide means 9 and the camera unit 15*a* are according to the present invention arranged in a common mounting part 5. As a result, a significantly improved precision in the manufacture of the pen 1 is obtained since several sources of variations are eliminated. The mounting part is formed with three mounting holes 11, 16, 21 for mounting of the mounting aid 9*a*, the camera unit 15 and the light-emitting diode 20, respectively. The first mounting hole 11 simultaneously holds the pen point guide means 9.

In previous electronic pens, the light-emitting diode was mounted on the printed circuit board, with the ensuing variations in the position of the light-emitting diode in relation to the pen point guide means, the sensor and imaging components. In order to meet such variations, the illuminated area had to be considerably larger than the imaged area on the base. According to the invention, the light-emitting diode 20 is advantageously mounted in the common mounting part 5 instead, as is also indicated in FIG. 6. This ensures that the area scanned by the camera unit 15 is given good illumination, which improves the possibilities of determining the position of the pen 1 with great accuracy. The illuminated area can to a higher degree than before be adjusted to the imaged area, which means that the light intensity in this area may be increased. Alternatively, the driving current to the light-emitting diode can be reduced, without decreasing detectability, in order to save current and thus increase the battery life.

In one embodiment, the mounting part 5 is injection-molded of thermoplastic, for instance consisting of polycarbonate and ABS plastic. Also other materials, such as thermosetting plastics or metals, can be used in the mounting part 5. The forming can also be effected by, for instance, casting or milling.

In the manufacture of an electronic pen according to the invention, the pen point guide means 9 is designed as a continuous portion of the mounting part 5. The pen point guide means 9 can alternatively be formed as a separate part which is inserted into the through hole 14. The mounting aid 9*a* is inserted into the mounting hole 11. Optics 33 for angling the optical axis C of the camera unit 15 can, when necessary, be arranged in the second mounting hole 16. The camera unit 15 is inserted into the second recess 17 in the second mounting hole 16.

The light-emitting diode 20 is inserted into the third mounting hole 21. The third mounting hole 21 has three inclined, essentially plane supporting walls 21*a*, 21*b*, 21*c* which are arranged to connect to each other in the circumferential direction and form part of the peripheral wall of the hole. The alignment of the light-emitting diode 20 is controlled by means of line contact with the two outer angled supporting walls 21*a*, 21*c*. As a result, the light-emitting diode 20 is safely fixed and cannot be angled from its correct position in the third mounting hole 21. The orientation of the axial symmetry axis of the light-emitting diode 20, i.e. the nominal main direction of the light cone of the light-emitting diode, is given by the position of the two supporting walls, and therefore the mounting variations are minimized. By the light-emitting diode 20 only being contacted with two outer supporting walls, not with an intermediate supporting wall, any variations in the radial extent of the housing of the light-emitting diode will not significantly affect the positioning of the axial symmetry axis of the light-emitting diode 20 relative to the mounting hole 21. It should also be pointed out that the intermediate supporting wall in an alternative embodiment can be excluded.

The light-emitting diode can be fixed by means of adhesive, such as hot-melt adhesive. According to one embodiment, this adhesive is curable by radiation, for instance in the UV waveband. In one such embodiment, the mounting part is suitably made of a material which is translucent within the waveband in question.

The mounting part is also suitably made of a material which is opaque to radiation related to the radiation emitted by the light-emitting diode 20 and by the illuminated base 29. This reduces the risk of undesirable radiation penetrating into the interior of the pen and interfering with the position determination.

A protective sheet of glass 26 can be mounted over the outer end 13 of the mounting part 5 on the one hand to provide an even front surface and, on the other hand, to protect the components arranged in the mounting part 5.

The mounting part 5 and the mounted pen point guide means 9, camera unit 15 and light-emitting diode 20 are fixed in the forward portion 2a of the pen 1. Owing to this location, the mounting part constitutes a holder for the pen point guide means 9, the camera unit 15 and the light-emitting diode 20 and at the same time part of a front portion 27 for sealing the forward portion 2a of the pen 1.

In order to facilitate the installation of the mounting part 5 in the casing 6, and lock the mounting part therein, a protruding shoulder portion 5c is arranged to wholly or partly extend along the circumference of the mounting part 5 and cooperate with the front end of the casing 6, as shown in FIGS. 2–3. From the shoulder portion 5 extends a circumferential engaging surface 5d with a gradually increasing radius towards the inner end 5a of the mounting part 5. The engaging surface 5d is designed to cooperate with a correspondingly formed front portion of the casing 6 of the pen (as indicated with broken lines in FIG. 3). Thus the mounting part 5 is held in place in the forward portion 2a of the pen 1 by a form-fit engagement, on the one hand between the shoulder portion 5c and the front end of the casing 6 and, on the other hand, between the engaging surface 5d and the front portion of the casing 6.

When manufacturing the pen, one or more printed circuit boards 28 are suitably also fixed in the casing 6 of the pen 1. One or more processors, memory units and communication units (transceivers), as well as electric wiring, charging sockets etc may also be mounted on/integrated with said printed circuit board/boards. The camera unit 15 is then connected to the processor 30 by means of a flexible electric coupling 19. Additional components, such as a battery, may be mounted in the interior of the pen 1 before the casing 6 is sealed, for instance by joining two casing halves.

The invention has been described above by way of exemplifying embodiments. However, the invention is in no way limited to these but includes many other variants, according to that defined by the scope of protection of the appended claims and as further easily realized by a person skilled in the art.

For instance, the above writing means can be, instead of an ink cartridge, a fountain pen unit, a pencil unit, a felt pen unit, a magnetic head for cooperation with a selectively magnetizable base, a heating head for cooperation with a heat sensitive base, an electronically controlled ink jet unit, a miniaturized laser printer unit etc.

Furthermore, the camera unit, the pen point guide means, the light-emitting diodes, as well as additional or alternative components, may be attached to the mounting part by means of adhesive, by press fit, by form-fit engagement (for instance snap-action coupling, threads, wedges etc), by welding (ultrasound, heat, etc), by soldering, or by some other functionally equivalent technique. Corresponding techniques can also be used to fix the mounting part in the interior of the pen.

What we claim and desire to secure by Letters Patent is:

1. An electronic pen comprising:
    a writing device extending into the interior of the pen;
    an imaging detector unit for recording images and an image processor for calculating positions of the pen based on said images; and
    a common mounting part which is fixedly mounted and extending at least partially into the interior of the pen and comprises:
        a body with opposite first and second end faces,
        a writing device through hole which extends between the end faces of the body for guiding the writing device to be movable along the writing device hole,
        an imaging through hole which extends between the end faces of the body and has a mounting portion in connection with the first end face for holding the imaging detector unit, said holes locating the writing device and the imaging detector unit in a predetermined spatial relationship, and
        an engaging element configured to fixedly locate the first end face of the body in the interior of the pen.

2. An electronic pen as claimed in claim 1, wherein the mounting part is designed to locate an optical axis of the detector unit relative to a longitudinal axis of the writing device.

3. An electronic pen as claimed in claim 2, wherein at least one optical deflecting component is arranged in the mounting part for deflecting the optical axis towards the longitudinal axis.

4. An electronic pen as claimed in claim 2, wherein the detector unit is a self-contained unit and comprises a sensor and an imaging system which is operatively connected with the sensor and defines the optical axis.

5. An electronic pen as claimed in claim 4, wherein said sensor is an electrooptical image sensor.

6. An electronic pen as claimed in claim 1, wherein the mounting part is designed to locate a focal plane of the detector unit relative to a contact point of the writing device on a base.

7. An electronic pen as claimed in claim 1, wherein the mounting part is arranged in a forward portion of the pen and forms part of a front portion of the pen.

8. An electronic pen as claimed in claim 1, wherein the writing device through hole is designed so as to give the writing device a tight fit.

9. An electronic pen as claimed in claim 1, further comprising a light source which is arranged in the mounting part.

10. An electronic pen as claimed in claim 9, wherein the light source comprises a light-emitting diode.

11. An electronic pen as claimed in claim 1, wherein the detector unit is connected by a flexible electric coupling to the image processor arranged on a printed circuit board in the interior of the pen.

12. An electronic pen as claimed in claim 1, further comprising a sensor which is adapted to sense whether the writing device is pressed against a base and which is supported by the mounting part.

13. An electronic pen as claimed in claim 12, wherein the sensor comprises a pressure sensor.

14. An electronic pen as claimed in claim 12, wherein an insert, which is adapted to hold a portion of the writing device, is arranged in a movable and form-fit manner in a sensor housing arranged in the mounting part and arranged to be contacted with the sensor as the writing device is being pressed against a base.

15. The electronic pen of claim 1, wherein said common mounting part is constructed as a single element having a fixed relationship between the imaging though hole and writing device through hole.

16. The electronic pen of claim 1, wherein optics are provided in said imaging through hole.

17. A mounting part for installation in an electronic pen, which mounting part is constructed comprising:
   a body with opposite first and second end faces for fixed mounting to a pen body by partially extending into the interior of the pen body,
   a writing device through hole which extends between the end faces of the body for guiding a writing device to be movable along the writing device hole,
   an imaging through hole which extends between the end faces of the body and has a mounting portion in connection with the first end face for holding an imaging detector unit,
   said holes being arranged to locate the writing device and the detector unit in a predetermined spatial relationship, and an engaging element which is designed to fixedly locate the first end face of the body inside said pen.

18. A mounting part as claimed in claim 17, which is designed to locate an optical axis of the detector unit relative to a longitudinal axis of the writing device.

19. A mounting part as claimed in claim 18, wherein the detector unit is a self-contained unit and comprises a sensor and an imaging system which is operatively connected with the sensor and defines the optical axis.

20. A mounting part as claimed in claim 17, which is designed to locate a focal plane of the detector unit relative to a contact point of the writing device on a base.

21. A mounting part as claimed in claim 17, which further includes an arranging element that arranges a light source.

22. A mounting part as claimed in claim 21, wherein said arranging element that arranges a light source comprises a hole, which has at least two walls which are inclined relative to each other and intended for line contact with said light source.

23. A mounting part as claimed in claim 17, which further includes a holder that holds a sensor adapted to sense whether the writing device is pressed against a base.

24. A mounting part as claimed in claim 17, which is designed for fixed mounting in a forward portion of the pen to constitute part of a front portion of the pen.

25. A mounting part as claimed in claim 17, further comprising a mounting hole which opens in the second end face and is configured to hold a light source.

26. A mounting part as claimed in claim 17, wherein the engaging element is provided in a circumferential area of the body, between its end faces.

27. A mounting part as claimed in claim 17, wherein the engaging element is designed to cooperate with a pen casing portion.

28. A mounting part as claimed in claim 27, wherein the pen casing portion is a front pen casing portion which defines a mounting opening of the pen.

29. The mounting part of claim 17, wherein said mounting part is constructed as a single element having a fixed relationship between the imaging though hole and writing device through hole.

30. The mounting part of claim 17, wherein optics are provided in said imaging through hole.

31. A method of making an electronic pen, comprising:
   providing a common mounting part with a writing device through hole for guiding a writing device to be movable along the writing device through hole;
   providing the common mounting part with an imaging through hole; and
   attaching an imaging detector unit to the common mounting part in alignment with the imaging through hole;
   whereby said common mounting part is configured to extend at least partially into the interior of a pen casing for installation thereto to locate the writing device and the imaging detector unit in a predetermined spatial relationship.

32. A method as claimed in claim 31, further comprising engaging said common mounting part with a pen casing to fixedly locate the detector unit inside the pen.

33. A method as claimed in claim 31, further comprising attaching a light source to said common mounting part.

34. A method as claimed in claim 31, further comprising installing said common mounting part in a forward portion of the pen.

35. A method as claimed in claim 31, further comprising installing the writing device in the writing device through hole.

36. The method of claim 31, wherein said common mounting part is constructed as a single element having a fixed relationship between the imaging though hole and writing device through hole.

* * * * *